(12) United States Patent
Mercer

(10) Patent No.: US 8,910,073 B2
(45) Date of Patent: Dec. 9, 2014

(54) ENHANCING VISUAL CONTINUITY IN SCROLLING OPERATIONS

(75) Inventor: Paul Mercer, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2030 days.

(21) Appl. No.: 11/945,226

(22) Filed: Nov. 26, 2007

(65) Prior Publication Data

US 2009/0138815 A1    May 28, 2009

(51) Int. Cl.
  *G06F 3/14* (2006.01)
(52) U.S. Cl.
  USPC ............. 715/784; 715/786; 715/856; 706/10; 382/174
(58) Field of Classification Search
  CPC ..................... G06F 3/14; G06F 3/17
  USPC .......... 715/200–277; 700/701–866; 709/201–229; 705/50–79; 345/30–111; 348/206–231.9; 706/10; 382/174
  See application file for complete search history.

(56) References Cited

U.S. PATENT DOCUMENTS

| | | | |
|---|---|---|---|
| 5,621,430 A * | 4/1997 | Bricklin | 715/856 |
| 6,476,831 B1 | 11/2002 | Wirth et al. | |
| 6,598,045 B2 * | 7/2003 | Light et al. | 1/1 |
| 7,305,129 B2 * | 12/2007 | Chellapilla et al. | 382/174 |
| 7,426,496 B2 * | 9/2008 | Kristjansson | 706/10 |
| 2002/0113823 A1 | 8/2002 | Card et al. | |
| 2003/0229900 A1 | 12/2003 | Reisman | |
| 2004/0133910 A1 | 7/2004 | Gordon et al. | |
| 2007/0143705 A1 * | 6/2007 | Peters | 715/786 |
| 2007/0157112 A1 * | 7/2007 | Peters | 715/786 |

FOREIGN PATENT DOCUMENTS

WO    WO-02071199 A1    9/2002

OTHER PUBLICATIONS

"Scroll Pointer—A Small Pointer (Arrow or a Small Icon) to Appear on the Screen When the User Scrolls", IBM Technical Disclosure Bulletin, International Business Machines Corp. (Thornwood), US, vol. 34, No. 11, Apr. 1, 1992, pp. 480-482, XP000303337, ISSN: 0018-8689.
Supplementary European Search Report—EP08854946—Search Authority—Munich Patent Office May 20, 2014.

* cited by examiner

*Primary Examiner* — Ruay Ho
(74) *Attorney, Agent, or Firm* — Mahamedi Paradice LLP

(57) ABSTRACT

A visual indicator distinguishes between newly displayed content and previously displayed content during and/or after a scrolling operation. The newly displayed content is displayed in a different format, or with a different background, or with some other visual indication, as compared with content that was previously displayed and is still displayed after the scrolling operation. In this manner, the user is given a visual context for scrolling operations that provides an intuitive reference point when scrolling through a document. A user can easily determine where the newly displayed content picks up from where the previously displayed content left off. The visual indicator can be transitory if desired, so that it gradually fades after some period of time.

23 Claims, 12 Drawing Sheets

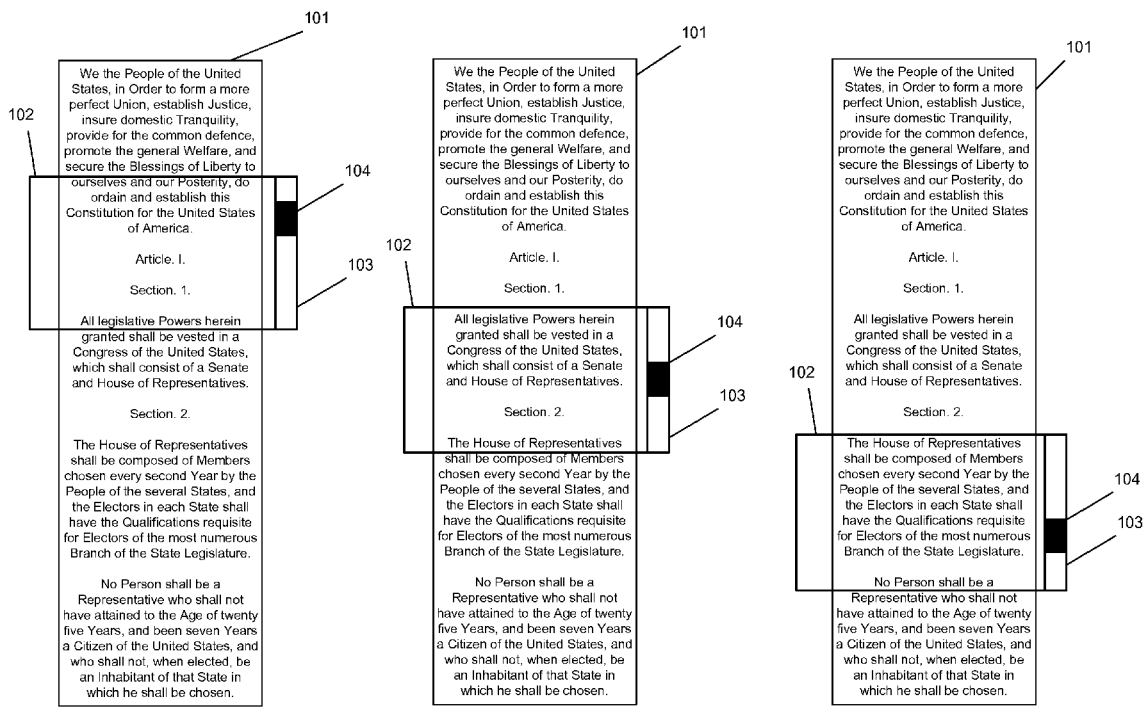
*FIG. 2A (PRIOR ART)*   *FIG. 2B (PRIOR ART)*   *FIG. 2C (PRIOR ART)*

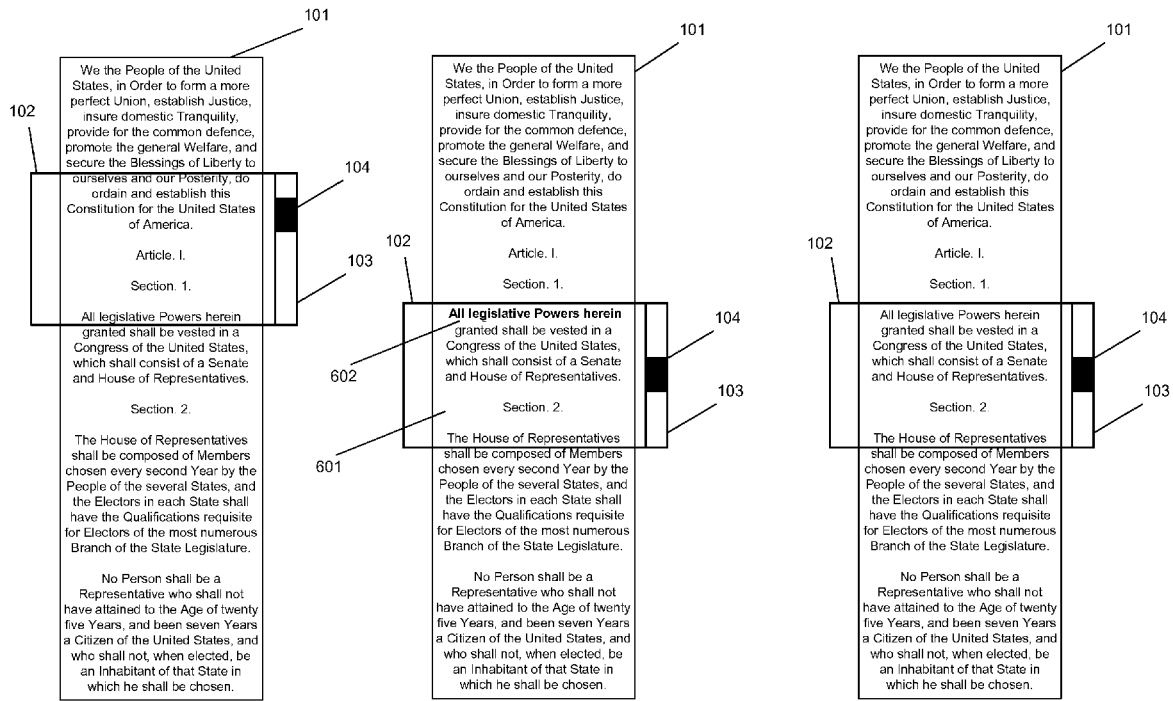

ENHANCING VISUAL CONTINUITY IN SCROLLING OPERATIONS

FIELD OF THE INVENTION

In various embodiments, the present invention relates to scrolling operations in a user interface, and more particularly to techniques for enhancing visual continuity by displaying a visual context indicator during a scrolling operation.

DESCRIPTION OF THE RELATED ART

It is well known to provide scrolling functionality in a user interface, so as to facilitate the display of documents that are too large to be effectively presented on a display device or within a particular window on a display device. Typically, a portion of the document is shown within a display area such as a window. The user inputs a command to cause the display to change so that a different portion of the document is displayed. The user can input the command by manipulating a scrollbar or by any known input means, such as for example, a menu command, keyboard command, or the like. Scrolling can take place in one dimension (such as vertical scrolling in a text document), or in two dimensions (such as horizontal and vertical scrolling for an image document).

The user may scroll through a document by any increment, including line-by-line, page-by-page, or the like. Scrolling can be initiated using any input device, such as dragging a scrollbar thumb, using up and down arrow keys on a keyboard, scroll wheel, rocker switch, five-way navigation button, or the like. Such command input mechanisms may cause a selection or insertion point to move within the on-screen portion of the document, and/or may cause the document to scroll by one or more lines when the top or bottom of the on-screen portion is approached or reached.

For example, when viewing a web page, a user can cause the display to scroll by any arbitrary amount. In many web browsers, smooth scrolling is provided, so as to give the user instantaneous feedback as scrolling operations take place.

Scrolling may also be implemented on a fixed-increment basis, such as line-by-line, page-by-page, or the like. Page-by-page scrolling is commonly implemented using "page up" and "page down" keys. In scrolling operations, "page-by-page" typically refers to scrolling by approximately a screen's worth of displayed content, which does not necessarily correspond to an actual page of printed output. Thus, scrolling down by one page causes the last line of the currently displayed portion to move to the top of the display area. In some applications, when the bottom of the document is reached, a scrolling down by one page causes a partial page-down scroll, so that the last line of the document moves to the bottom of the display area.

Conversely, scrolling up by one page causes the first line of the currently displayed portion to move to the bottom of the display area. In some applications, when the top of the document is reached, a scrolling up by one page causes a partial page-up scroll, so that the first line of the document moves to the bottom of the display area.

For relatively small increments, most of the displayed portion of the document remains on the screen while a new portion is displayed. For example, a single line (or other small amount of the displayed content) may be removed from the top of the display window, while a new line (or other increment of new content) is introduced at the bottom of the display window.

Scrolling can cause users to become disoriented as to the context of the displayed portion within the document as a whole. Such problems are particularly exacerbated when page-by-page scrolling or continuous line scrolling is taking place, since all or nearly all of the displayed portion of the document is removed from the screen and replaced by a new portion. A user attempting to continue reading the text in a document after a scrolling operation may have difficulty finding the point within the document where he or she left off, and may end up re-reading some of the document in attempt to find the desired point.

Various visual indicators have been devised in an attempt to provide users with an indication as to the position, or context, of the displayed portion within the document. One common device is a position controller and indicator (often referred to as a "thumb") within a scroll bar. However, such indicators are typically limited to providing a static and indirect indication of the current scroll position within a document, rather than an indication of the effect of the most recent scrolling operation on the displayed content itself. Furthermore, such indicators are typically provided in a border area of a screen or window, where the user may not notice them. Furthermore, what is relevant to a user is often the change in position that occurs during a scrolling operation; since the user is typically focused on the document content itself, he or she is not likely to pay attention to what may be occurring with respect to a scroll bar position indicator or similar device. Finally, position indicators typically move in the opposite direction to the content: while the user scrolls down within a document, the indicator moves down while the displayed content moves up.

Existing scrolling techniques provide "smooth scrolling" that gradually moves the displayed content within the display area, so as to improve the user's ability to see the effect of a scrolling operation. However, the added information provided by a smooth scrolling operation is transitory in nature, being available only during the actual scrolling itself; once the document has reached its new scroll position, no information remains on the screen showing the effect of the scrolling operation with respect to the previous position of the document.

What is needed is a visual indicator of context that allows a user to easily see the effect of a scrolling operation on the displayed content. What is further needed is a mechanism that clearly distinguishes between content that is newly displayed since the scrolling operation and content that was already displayed before the scrolling operation, so as to provide an intuitive indication of the overall context shift resulting from the scrolling operation. What is further needed is a visual context indicator that persists on the screen for at least some period of time after the scrolling operation has completed.

SUMMARY OF THE INVENTION

In various embodiments, the present invention provides a visual indicator to distinguish between newly displayed content and previously displayed content during and/or after a scrolling operation. The newly displayed content is displayed in a different format, or with a different background, or with some other visual indication, as compared with content that was previously displayed and is still displayed after the scrolling operation. In this manner, the user is given a visual context for scrolling operations that provides an intuitive reference point when scrolling through a document. A user can easily determine where the newly displayed content picks up from where the previously displayed content left off.

In one embodiment of the invention, a transitory visual indicator is provided, which gradually fades after some period of time. For example, newly displayed content can be displayed with a background color other than white, while previously displayed content is displayed with a white background. Then, after a few seconds (or some other period of time, or in response to user input), the non-white background fades to white so that the context indication disappears. In other embodiments, other types of indicators (transitory or non-transitory) can be used. The present invention thus provides a visual context indicator that persists on the screen for at least some period of time after the scrolling operation has completed.

Although the present invention is most useful when reading long documents such as books, magazines and web pages, it is applicable to any environment where a scrolling operation is used to control the display of a document that is larger than the on-screen area being used for display of the document. Thus, in one embodiment, in any such scrolling operation newly displayed content is shown with some visual indicator that distinguishes it from previously displayed content that is still being displayed.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

FIGS. 2A through 2C depict an example of a page-by-page scrolling operation for a text document, according to the prior art.

FIGS. 6A through 6F depict an example of a scrolling operation wherein visual context is displayed by a change in the appearance of displayed text, according to one embodiment.

DETAILED DESCRIPTION OF THE EMBODIMENTS

For purposes of the following description, many of the illustrations and descriptions set forth refer to one-dimensional (vertical) scrolling of documents that are primarily text-based. References to the "last line" or "first line" of a display area are thus used. However, one skilled in the art will recognize that the present invention can be implemented in connection with other types of documents, including without limitation graphics-based documents, web pages, photographs, spreadsheets, email messages, and the like. For many of these types of documents, two-dimensional scrolling (vertical and horizontal) is appropriate. Thus, although the present invention is described for illustrative purposes with respect to one-dimensional (vertical) scrolling of documents that are primarily text-based, such description is not intended to limit the scope of the invention to such particularities.

For purposes of the description provided herein, the following terms are defined as follows:

"Document" refers to any electronically displayable content item, such as a computer file. Examples of documents include word processing documents, websites, text documents, spreadsheets, drawings, photographs, and the like.

"Display area" refers to a window, pane, screen, or other area on a visual output device that is capable of displaying at least a portion of a document.

"Displayed content" or "displayed portion" refers to that part of a document that is currently being displayed within a display area.

"Scrolling operation" refers to any action that causes the display area to change the content being displayed therein, from a first displayed portion of a document to a second displayed portion of the same document. There may or may not be overlap between the first and second displayed portions.

"Previously displayed content" refers to that part of a document that was being displayed within a display area immediately prior to a scrolling operation.

"Overlapping content" refers to a portion of a document that is within the displayed content after a scrolling operation and was also within the previously displayed content immediately prior to the scrolling operation.

"Non-overlapping content" refers to a portion of a document that is within the displayed content after a scrolling operation and but was not within the previously displayed content immediately prior to the scrolling operation.

Figures 1A, 1B, 1C:
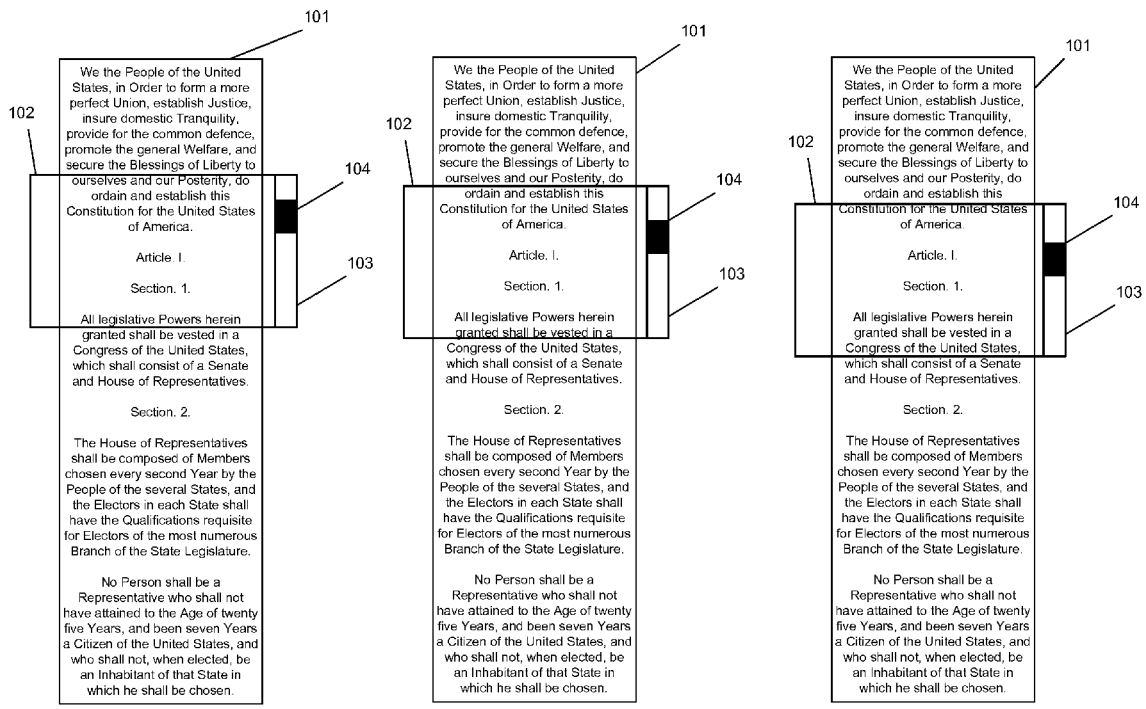
FIGS. 1A through 1C depict an example of a line-by-line scrolling operation for a text document, according to the prior art.

Referring now to FIGS. 1A through 1C, there is shown an example of a line-by-line scrolling operation for a text document, according to the prior art. Display area 102 shows part of document 101. Display area 102 can be any window, pane, screen, or other area on a visual output device that is capable of displaying at least a portion of a document. Document 101 can be any electronically displayable content item, such as a computer file.

As can be seen from FIGS. 1A through 1C, the size of document 101 permits only a portion of its content to be visible at any given time in display area 102. Accordingly, scrollbar 103 provides a well-known user input mechanism for navigating within document 101. Scroll position indicator 104 shows the relative position (within document 101) of the currently displayed portion of document 101. As is well known in the art, the user can drag scroll position indicator 104 up or down to change the display position of display area 102 so that it shows different portions of document 101. The user can also click on scrollbar 103, either above or below scroll position indicator 104, to change the display position of display area 102 on a page-by-page basis. The user can also use keyboard commands, such as arrow keys or page-up and page-down keys, to change the display position of display area 102 on a line-by-line or page-by-page basis.

In the example of FIGS. 1A through 1C, the user causes display area 102 to scroll within document 101 on a line-by-line basis. Accordingly, in FIG. 1A, display area 102 is shown at an initial position within document 101. In FIG. 1B, display area 102 has been scrolled down one line, so that it is now positioned one line down from its initial position. In FIG. 1C, display area 102 has been scrolled down one more line, so that it is now positioned two lines down from its initial position.

During each scrolling operation, scroll position indicator 104 moves to indicate the position of display area 102 within document 101.

The portion of document 101 that is within display area 102 both before and after a scrolling operation is referred to herein as the "overlapping content." As is evident from FIGS. 1A through 1C, after a line-by-line scrolling operation most of the displayed content is overlapping content; i.e., it was present on the screen prior to the scrolling operation and remains on the screen (though in a slightly different position) after the scrolling operation.

Referring now to FIGS. 2A through 2C, there is shown an example of a page-by-page scrolling operation for a text document, according to the prior art. Here, the user causes display area 102 to scroll within document 101 on a page-by-page basis. Accordingly, in FIG. 2A, display area 102 is shown at an initial position within document 101. In FIG. 2B, display area 102 has been scrolled down one page, so that it is now positioned one page down from its initial position. As is common in such scrolling operations, the last line in the previous position (FIG. 2A) becomes the first line in the new position (FIG. 2B). Thus, the actual amount of scrolling is one line less than a complete screenful. In FIG. 1C, display area 102 has been scrolled down one more page, so that the last line in the position shown in FIG. 2B becomes the first line in the new position of FIG. 2C. As before, during each scrolling operation, scroll position indicator 104 moves to indicate the position of display area 102 within document 101.

In page-by-page scrolling, users are often disoriented because of the relatively large positional change within document 102 and because a relatively small portion of the previously displayed content remains on the screen after the scrolling operation. Position indicator 104 provides a visual indicator of a relative position within a document, but it is a poor indicator of context and is often ignored by users. Smooth scrolling effects are often performed to generate a smooth transition from one position to another, thus aiding the user in maintaining context during a scrolling operation. However, as discussed above, smooth scrolling is only partially effective, since it is merely a transition effect that has no lasting visual component after the scrolling operation has completed. Often, the scrolling is too fast, and the old and new content too similar for the user to maintain visual context.

In the same manner, line-by-line scrolling operations can also be disorienting to users, particularly when the single line scroll operation is repeated continuously.

Figure 3:
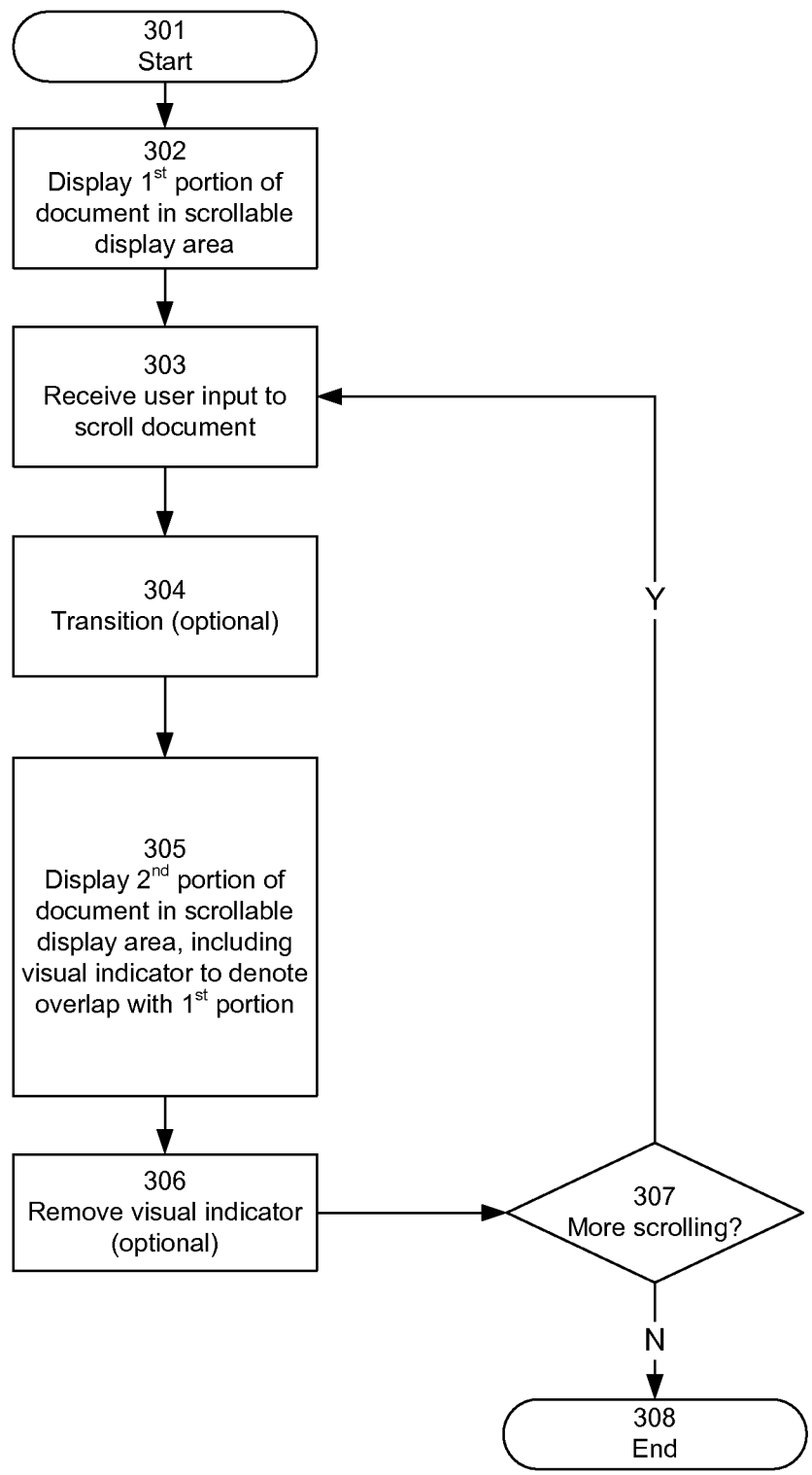
FIG. 3 is a flowchart depicting a method of practicing the present invention according to one embodiment.

Page-by-page scrolling operations can cause significantly more disorientation. Referring now to FIG. 3, there is shown a flowchart depicting a method of practicing the present invention according to one embodiment. Referring also to FIGS. 4A through 4F, there is shown an example of a scrolling operation wherein visual context is displayed by background highlighting, according to one embodiment. While line-by-line scrolling is shown for illustrative purposes, one skilled in the art will recognize that the present invention can be implemented in a scrolling display regardless of the scroll increment.

Figures 4A, 4B, 4C:
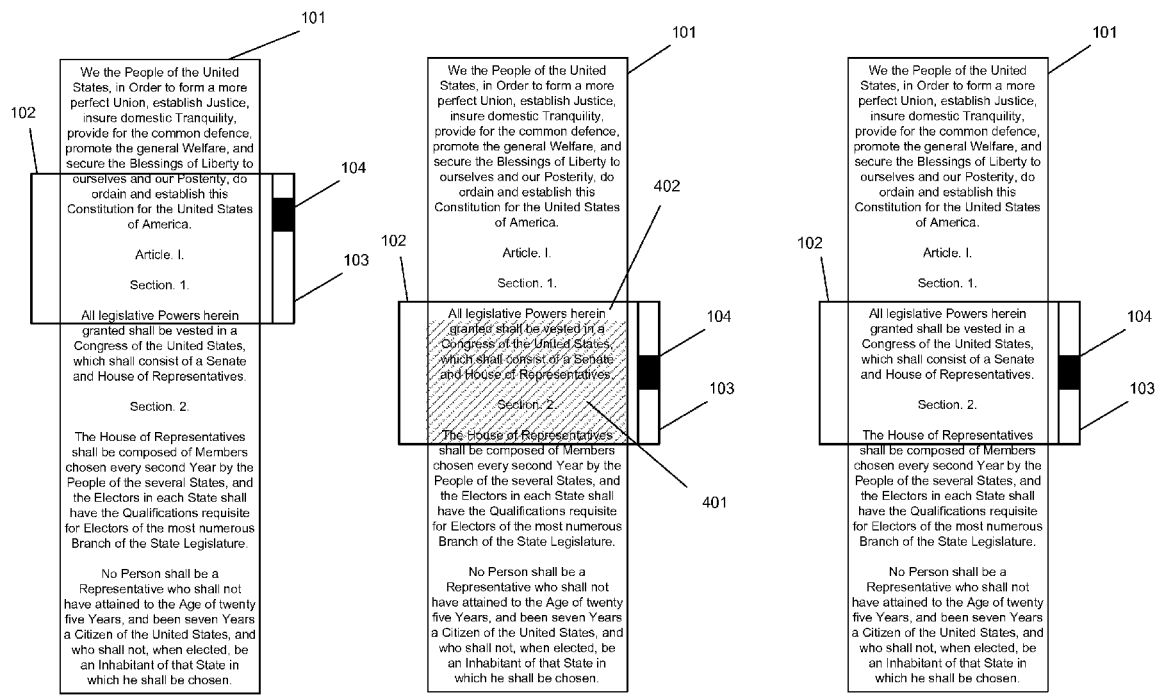
FIGS. 4A through 4F depict an example of a scrolling operation wherein visual context is displayed by background highlighting, according to one embodiment.

The method begins 301. Initially, as shown in FIG. 4A, a first portion of document 101 is displayed 302 in display area 102. Scroll position indicator 104 shows the relative position of the displayed portion within document 101. User input indicating a scrolling operation is received 303, for example by the user clicking on an area of scrollbar 103, or hitting a page-down key, or the like.

In one embodiment, in response to the user input, a scrolling operation is performed. Alternatively, the scrolling operation may be initiated automatically or in response to some other command or event rather than in response to user input.

As is well known in the art, in one embodiment a transition effect may be performed 304, such as for example smooth scrolling, so as to reinforce the visual metaphor of moving within document 101. Then, as shown in FIG. 4B, a second portion of document 101 is displayed 305 within display area 102. If any of the first portion of document 101 also lies within the second portion, that area is referred to as "overlapping content". In one embodiment, a visual indicator is provided, so as to distinguish the overlapping content (if any) from other content within the second portion of document 101.

In one embodiment, the present invention can be implemented in connection with smooth scrolling, although smooth scrolling is not necessary.

FIG. 4B shows one example of such a visual indicator according to one embodiment. Specifically, the overlapping content 402 is shown with one background color, while the non-overlapping content 401 is shown with a different background color. In FIG. 4B, the overlapping content 402 is shown with a white background, and the non-overlapping content 401 is shown with a shaded background, although one skilled in the art will recognize that any background color or other visual indicators can be used.

In the example of FIG. 4B, the background of the overlapping content 402 matches the "normal" background color being used in display area 102, while the non-overlapping content 401 (i.e., the newly displayed content) has a background that is different from the normal background color. Alternatively, as discussed below in connection with FIG. 4E, in another embodiment the background of the non-overlapping content 401 can match the normal background color being used in display area 102, while the overlapping content 402 can have a background that is different from the normal background color. Any mechanism for visually distinguishing the overlapping content from the newly displayed content can therefore be used.

In one embodiment, the visual indicator is introduced with a transition effect analogous to the transition effect of step 304. Thus, for example, if smooth scrolling is in effect, the visual indicator (such as a background color) is smoothly introduced as the document content moves up the screen.

In one embodiment, the visual indicator is removed 306 from display area 102, either after a predetermined period of time, or in response to some user action, or in response to some other trigger event. For example, the visual indicator can be removed 306 when the user hits a key or performs some other input operation. Alternatively, it can be removed 306 in response to the user performing another scrolling operation. In one embodiment, removal 306 of the visual indicator is performed gradually, for example by causing it to fade gradually until the overlapping content 401 and non-overlapping content 402 are displayed using the same, normal background color, as shown in FIG. 4C. In another embodiment, removal 306 of the visual indicator is performed instantaneously. In another embodiment, removal 306 of the visual indicator is performed with a transition effect. FIG. 4C depicts the state of the display after the visual indicator has been removed 306. The present invention thus provides a visual indicator that persists on the screen for at least some period of time after the scrolling operation has completed.

If more scrolling operations are performed 307, in one embodiment the method of the present invention returns to step 303 to receive user input for the new scrolling operation. If no more scrolling operations are performed 307, the method ends 308.

In one embodiment, the present invention does not consider content to be previously visible until it has been visible on the screen for some period of time, such as for example 0.25 seconds or some other interval. Thus, if the user performs several scroll operations in rapid succession, such a technique would avoid rapid visual flashing of the new content indicator that might occur with each scroll operation. Rather, all content would be considered "new" until the user stops scrolling for at least the predefined interval of time. Only at that point would the on-screen content be considered previously visible.

For example, in one embodiment, if the visual indicator is implemented by dimming previously visible content, the first scroll operation would cause previously visible to be dimmed while new content would not be dimmed. If the user scrolls again rapidly, without waiting for the predetermined length of time, then the content remain that became visible after the first scroll operation would remain undimmed even after the second scroll operation.

Figure 4D:
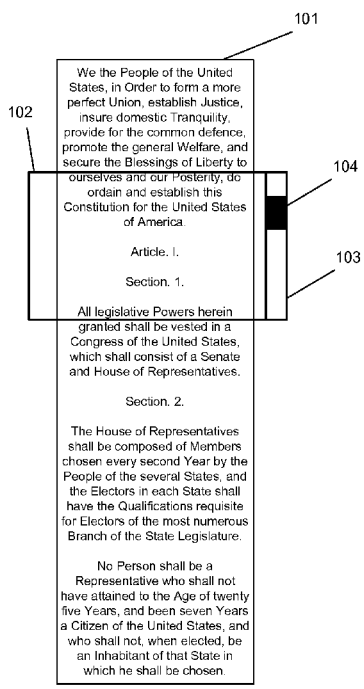
Figure 4E:
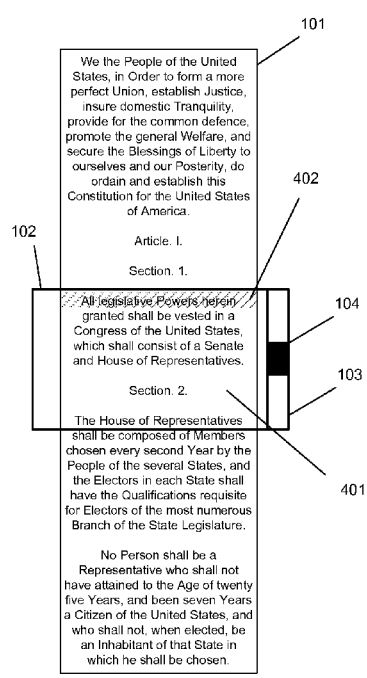
Figure 4F:
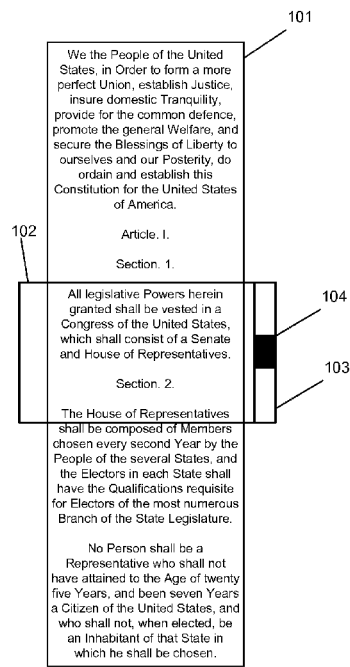

Referring now to FIGS. 4D through 4F, there is shown an alternative embodiment wherein the background of the non-overlapping content 401 is shown in the normal background color being used in display area 102, while the overlapping 402 is presented with a background that is different from the normal background color. Initial display, as shown in FIG. 4D, is the same as that of FIG. 4A. FIG. 4E shows the display with overlapping content 402 being presented in a distinct background color. FIG. 4F depicts the state of the display after the visual indicator (the distinct background color) has been removed 306.

Figures 5A, 5B, 5C:
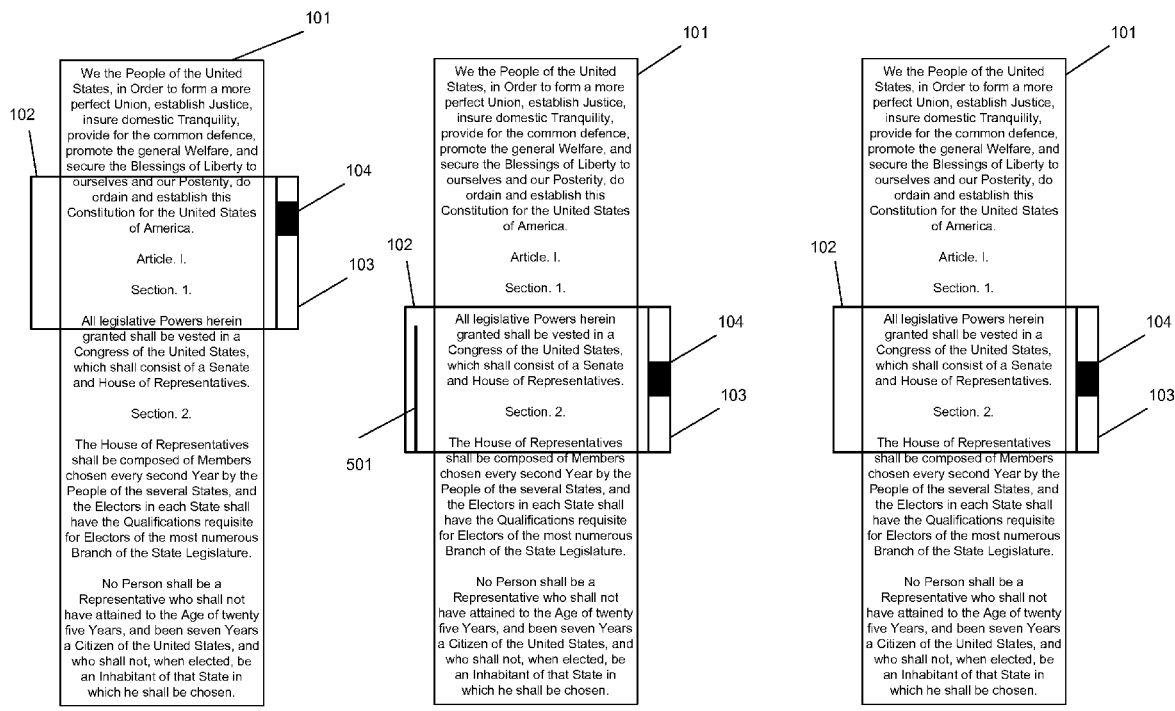
FIGS. 5A through 5F depict an example of a scrolling operation wherein visual context is displayed by a change bar, according to one embodiment.

Referring now to FIGS. 5A through 5F, there is shown an alternative example of a scrolling operation, according to one embodiment. Here, the visual indicator of step 305 is a change bar 501. Initial display, as shown in FIG. 5A, is the same as that of FIG. 4A. In FIG. 5B, change bar 501 is shown alongside non-overlapping text; change bar 501 extends vertically so that its top is adjacent to the top of the non-overlapping text and its bottom is adjacent to the bottom of the non-overlapping text. FIG. 5C depicts the state of the display after the visual indicator (the change bar 501) has been removed 306.

Figures 5D, 5E, 5F:
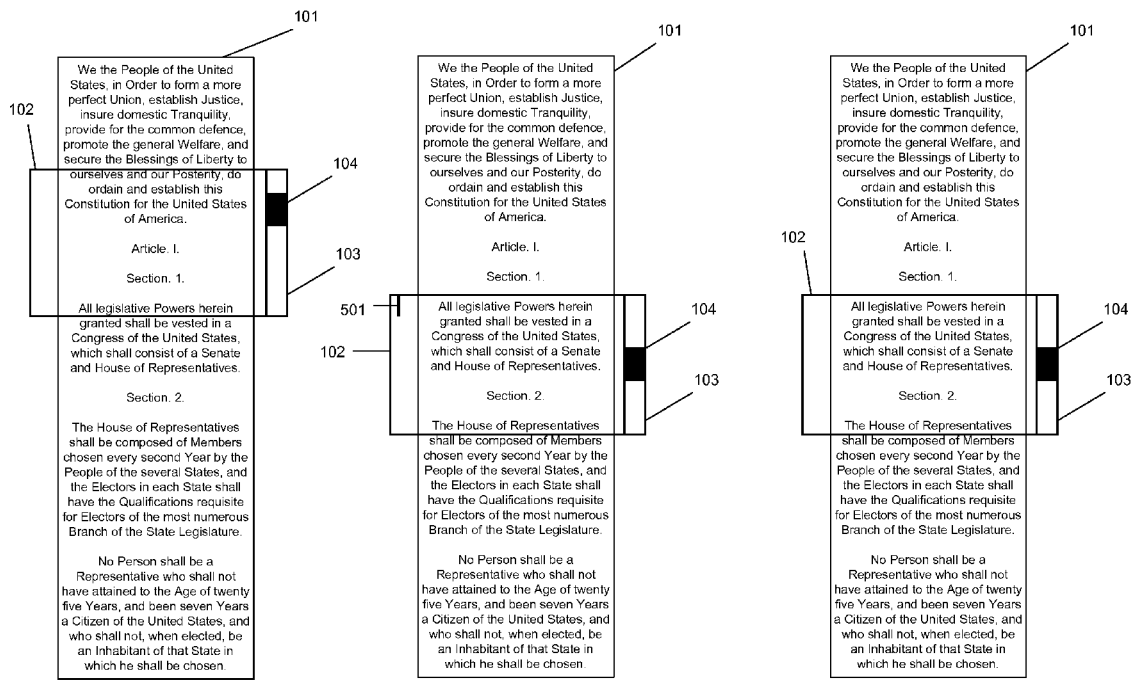

FIG. 5D again depicts an initial display identical to that of FIG. 4A. In FIG. 5E, change bar 501 is shown alongside overlapping text; change bar 501 extends vertically so that its top is adjacent to the top of the overlapping text and its bottom is adjacent to the bottom of the overlapping text. FIG. 5F depicts the state of the display after the visual indicator (the change bar 501) has been removed 306.

Figures 6A, 6B, 6C:
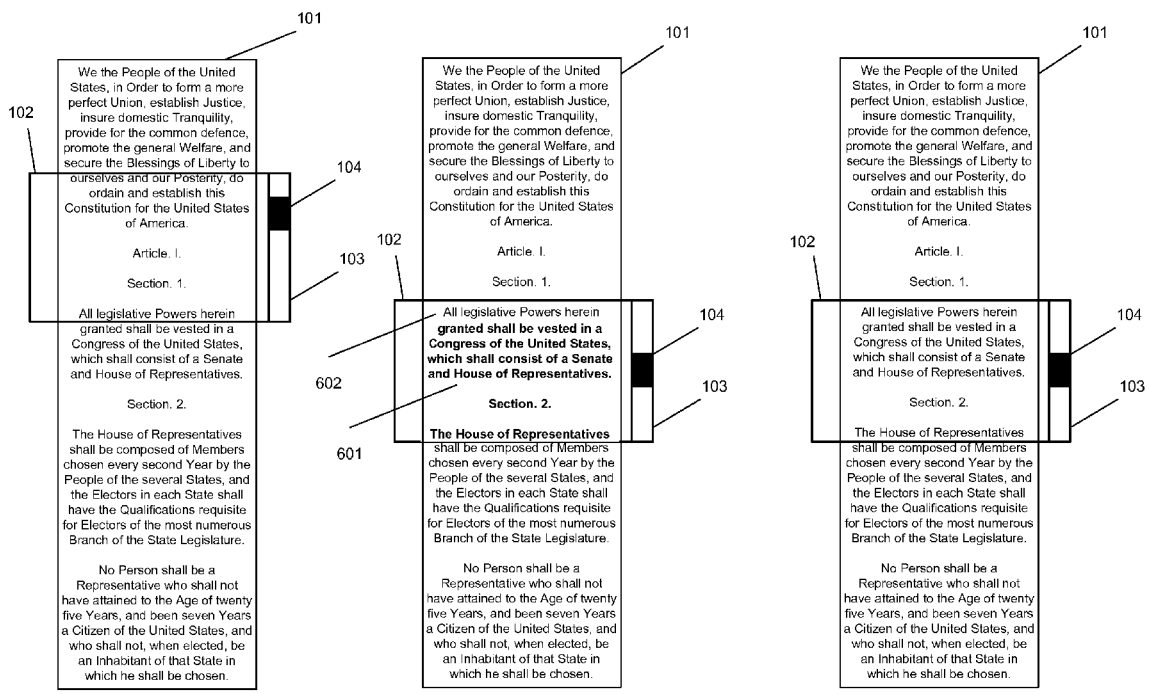

According to another embodiment, a distinctive typeface, color, font or font style can be used as a visual indicator distinguishing overlapping content 402 from non-overlapping content 401. Referring now to FIGS. 6A through 6F, there is shown an alternative example of a scrolling operation, according to one embodiment. Here, boldface text is used to provide a visual indicator distinguishing overlapping content 402 from non-overlapping content 401. Initial display, as shown in FIG. 6A, is the same as that of FIG. 4A. In FIG. 6B, non-overlapping text 601 is shown in a boldface style, while overlapping text 602 is shown in a normal style. FIG. 6C depicts the state of the display after the visual indicator has been removed 306 so that all the text is shown in the normal style.

FIG. 6D again depicts an initial display identical to that of FIG. 6A. In FIG. 6E, overlapping text 602 is shown in a boldface style, while non-overlapping text 601 is shown in a normal style. FIG. 6F depicts the state of the display after the visual indicator has been removed 306 so that all the text is shown in the normal style.

One skilled in the art will recognize that the use of a distinctive type-face, font or font style are merely examples of different types of visual indicators, and that any variation to the displayed content can be used to distinguish over-lapping content 402 from non-overlapping content 401. Examples include colors, transparency levels, boldness, italicization, and the like.

Figures 7A, 7B, 7C:
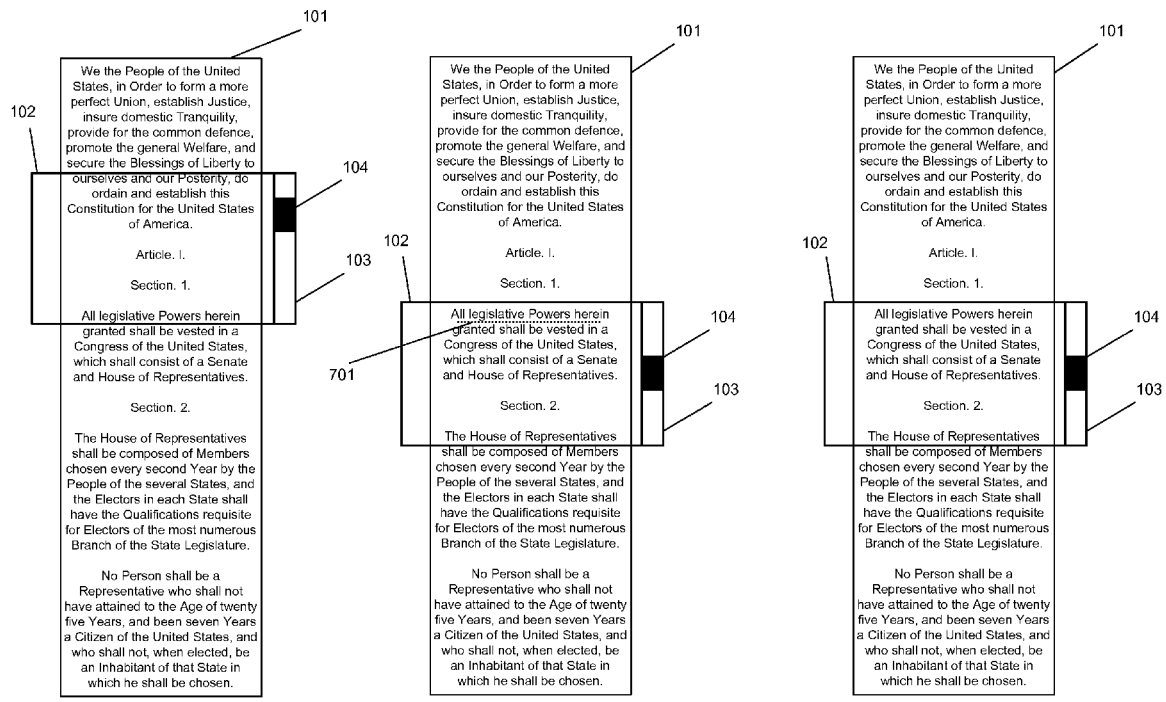
FIGS. 7A through 7C depict an example of a scrolling operation wherein visual context is displayed by a demarcation between newly displayed content and previously displayed content, according to one embodiment.

Referring now to FIGS. 7A through 7C, there is shown an alternative example of a scrolling operation, according to one embodiment. Here, the visual indicator of step 305 is a line 701 that serves as a demarcation between the over-lapping and non-overlapping text. Initial display, as shown in FIG. 7A, is the same as that of FIG. 4A. In FIG. 7B, line 701 is shown between the overlapping and non-overlapping text. FIG. 7C depicts the state of the display after the visual indicator (line 701) has been removed 306.

Although the examples described above set forth the invention in terms of one-dimensional scrolling along a single vertical axis, one skilled in the art will recognize that the present invention can be implemented in the context of a two-dimensional scrolling operation. Referring now to FIGS. 8A through 8F, there is shown an example of a two-dimensional scrolling operation for graphics-based content, wherein context is displayed by background highlighting, according to one embodiment. Here, document 101 is depicted as a graphics-based document including various shapes.

Figure 8A:
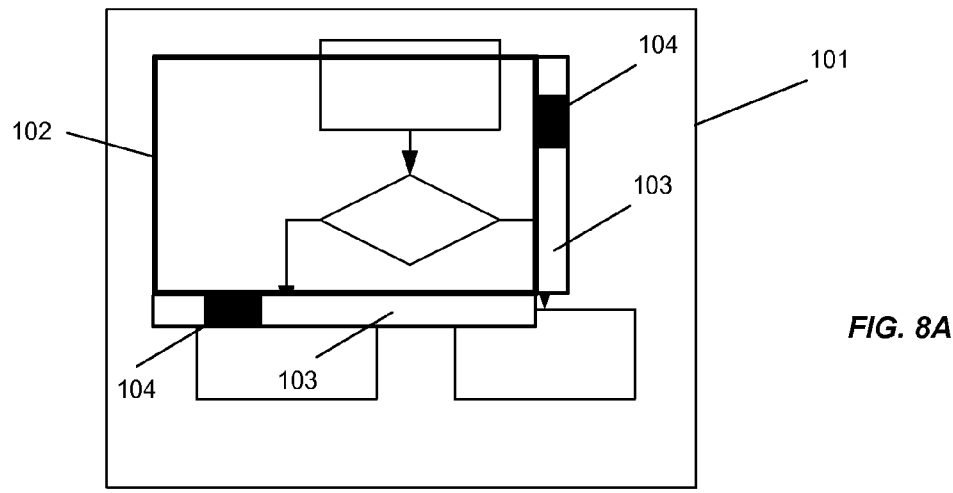
FIGS. 8A through 8F depict an example of a two-dimensional scrolling operation for graphics-based content, wherein context is displayed by background highlighting, according to one embodiment.

Initially, as shown in FIG. 8A, a first portion of document 101 is displayed in display area 102. Vertical and horizontal scroll position indicators 104 show the relative position of the displayed portion within document 101, along two axes.

Figure 8B:
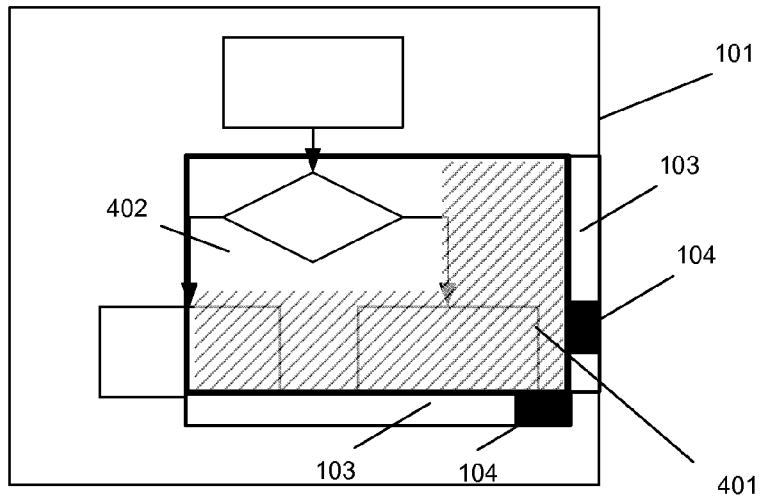
Figure 8C:
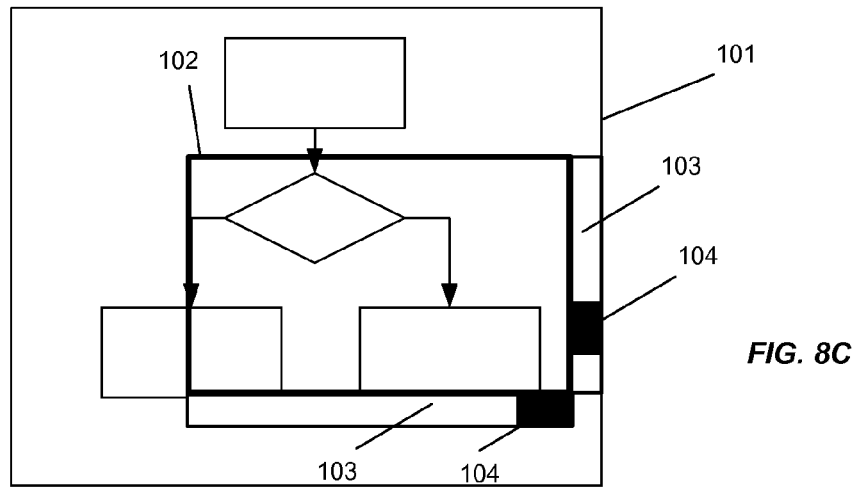

In response to the user input, a scrolling operation is performed. In this example, the scrolling operation includes both a vertical and horizontal component. As shown in FIG. 8B, after the scrolling operation, a second portion of document 101 is displayed within display area 102. The overlapping content 402 is shown with a white background, and the non-overlapping content 401 is shown with a shaded background, although one skilled in the art will recognize that any background color or other visual indicators can be used. FIG. 8C depicts the state of the display after the visual indicator has been removed 306.

Figure 8D:
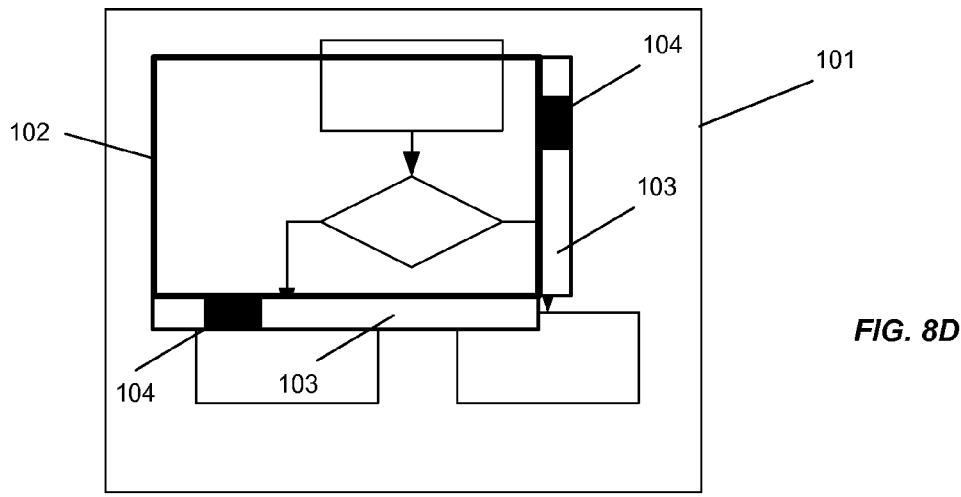
Figure 8E:
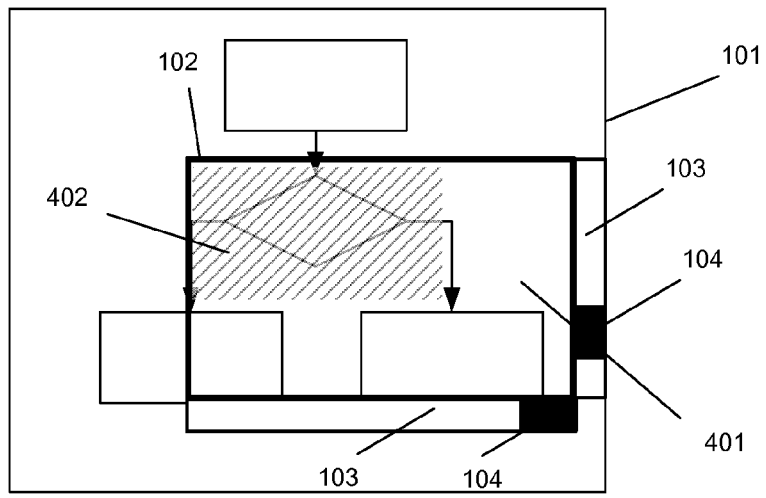
Figure 8F:
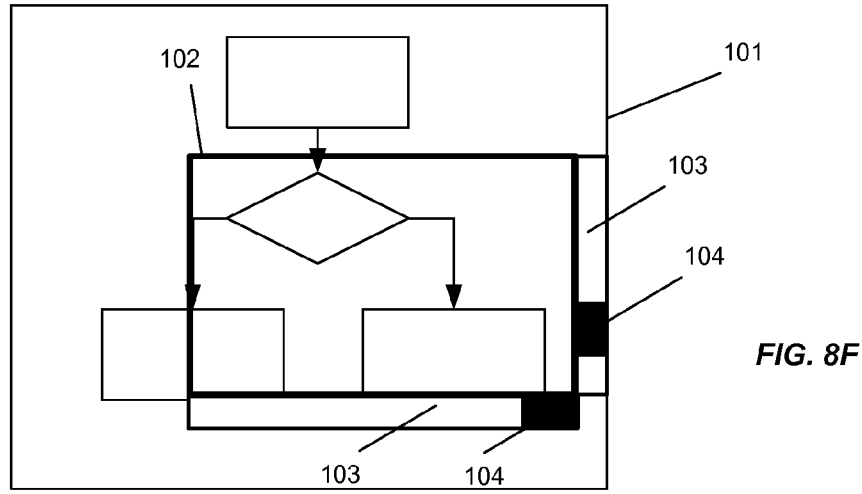

Referring now to FIGS. 8D through 8F, there is shown an alternative embodiment for a two-dimensional scrolling operation, wherein the background of the non-overlapping content 401 is shown in the normal background color being used in display area 102, while the overlapping 402 is presented with a background that is different from the normal background color. Initial display, as shown in FIG. 8D, is the same as that of FIG. 8A. FIG. 8E shows the display with overlapping content 402 being presented in a distinct background color. FIG. 8F depicts the state of the display after the visual indicator (the distinct background color) has been removed 306.

In various embodiments, the present invention can be implemented in any electronic display of content within a display area. Examples include computer screens, kiosks, personal digital assistants (PDAs), handheld computing devices, music players, televisions, cell phones, and the like. One skilled in the art will recognize that the techniques described herein may be extended to any environment where a scrolling display is implemented.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for scrolling a document within a display area of a display screen, the method comprising:
    initially displaying content from a first portion of the document within the display area of the display screen;
    scrolling the document on the display screen to display content from a second portion of the document within the display area of the display screen; and
    responsive to the displayed content from the second portion, displaying a visual indicator on the display screen to differentiate the content initially displayed from the content not initially displayed.

2. The method of claim 1, further comprising:
    subsequent to the initially displaying and prior to the scrolling, receiving user input indicating a scrolling operation,
    wherein displaying the visual indicator is performed responsive to received user input.

3. The method of claim 1, wherein displaying the visual indicator comprises displaying the visual indicator concurrently with displaying the content from the second portion of the document.

4. The method of claim 1, wherein scrolling the document comprises displaying a transition effect.

5. The method of claim 4, wherein displaying the transition effect comprises gradually introducing the visual indicator.

6. The method of claim 1, wherein displaying the visual indicator comprises highlighting the content from the second portion that was initially displayed.

7. The method of claim 1, wherein displaying the visual indicator comprises highlighting the content from the second portion that was not initially displayed.

8. The method of claim 1, wherein displaying the visual indicator comprises displaying the content from the second portion that was initially displayed with a first background color and displaying the content from the second portion that was not initially displayed with a second background color.

9. The method of claim 1, wherein displaying the visual indicator comprises displaying the content from the second portion that was initially displayed with a first style and displaying the content from the second portion that was not initially displayed with a second style.

10. The method of claim 1, wherein displaying the visual indicator comprises displaying the content from the second portion that was initially displayed with a first font and displaying the content from the second portion that was not initially displayed with a second font.

11. The method of claim 1, wherein displaying the visual indicator comprises displaying a demarcation between the content from the second portion that was initially displayed and the content from the second portion that was not initially displayed.

12. The method of claim 1, wherein scrolling the document comprises scrolling the document along a single axis.

13. The method of claim 1, further comprising removing the visual indicator.

14. The method of claim 13, wherein removing the visual indicator comprises removing the visual indicator gradually.

15. The method of claim 13, wherein removing the visual indicator comprises removing the visual indicator with a transition effect.

16. The method of claim 1, further comprising removing the visual indicator after a predetermined period of time.

17. The method of claim 1, wherein the display area is associated with a position in the document, and wherein scrolling the document comprises changing the position in the document.

18. The method of claim 1, further comprising:
subsequent to displaying the visual indicator:
scrolling the document on the display screen to display content from a third portion of the document within the display area of the display screen;
determining an interval of time between successive scrollings of the document;
responsive to the interval of time exceeding a predefined amount, and responsive to the displayed content from the third portion, displaying the visual indicator on the display screen to differentiate the content displayed from the second portion of the document from the content not displayed from the second portion of the document; and
responsive to the interval of time not exceeding the predefined amount, displaying the content from the third portion of the document without the visual indicator.

19. The method of claim 1, further comprising:
responsive to the displayed content from the second portion not comprising any content initially displayed, displaying the second portion in a visually distinct manner from the initially displayed content.

20. A computer program product for scrolling a document within a display area of a display screen, comprising:
a computer-readable medium; and
computer program code, encoded on the medium, for performing operations comprising:
initially displaying content from a first portion of the document within the display area of the display screen;
scrolling the document on the display screen to display content from a second portion of the document within the display area of the display screen; and
responsive to the displayed content from the second portion, displaying a visual indicator on the display screen to differentiate the content initially displayed from the content not initially displayed.

21. The computer program product of claim 20, wherein the display area is associated with a position in the document, and wherein the computer program code for scrolling the document comprises computer program code for changing the position in the document.

22. A system for scrolling a document within a display area of a display screen, comprising:
a display screen, for displaying first content from a first portion of the document within the display area;
an input device, for receiving user input requesting that the document be scrolled;
wherein, responsive to the user input, the display screen scrolls the document on the display screen to display second content from a second portion of the document within the display area; and
wherein, responsive to the displayed second content comprising any of the first content and any content not included in the first content, the display screen displays a visual indicator to differentiate the displayed second content that was included in the first content from the content that was not included in the first content.

23. The system of claim 22, wherein the display area is associated with a position in the document, and wherein the display screen scrolls the document by changing the position in the document.

* * * * *